United States Patent

Rizet et al.

[11] Patent Number: 5,549,811
[45] Date of Patent: Aug. 27, 1996

[54] PROCESS FOR DECONTAMINATION SOILS POLLUTED WITH METALS

[75] Inventors: Laurent Rizet, Viuz en Sallaz; Pierre E. Charpentier, Ville La Grand, both of France

[73] Assignee: Unimetal Societe Francaise des Aciers Longs, Rombas, France

[21] Appl. No.: 325,341

[22] PCT Filed: May 13, 1993

[86] PCT No.: PCT/FR93/00461

§ 371 Date: Feb. 10, 1995

§ 102(e) Date: Feb. 10, 1995

[87] PCT Pub. No.: WO93/24249

PCT Pub. Date: Dec. 9, 1993

[30] Foreign Application Priority Data

May 29, 1992 [FR] France .................................. 92 06635

[51] Int. Cl.⁶ .................................................. C22B 19/24
[52] U.S. Cl. ........................ 205/602; 205/604; 75/725; 75/743; 75/961; 423/101; 423/109
[58] Field of Search ..................................... 204/118, 115; 75/725, 743, 961; 423/109, 101; 205/602, 604

[56] References Cited

U.S. PATENT DOCUMENTS 3,630,669 12/1971 Naito et al. ............................ 23/125

4,588,540 5/1986 Kiefer et al. ............................... 264/43
4,610,722 9/1986 Duyvesteyn et al. ..................... 75/97 A
4,824,482 4/1989 Baldi ......................................... 75/254

FOREIGN PATENT DOCUMENTS

| 0022324 | 1/1981 | European Pat. Off. . |
| 0034137 | 8/1981 | European Pat. Off. . |
| 0034391 | 8/1981 | European Pat. Off. . |
| 3919788 | 7/1990 | Germany . |
| 3931017 | 3/1991 | Germany . |
| 1263290 | 10/1989 | Japan . |
| 979527 | 12/1982 | U.S.S.R. . |
| 1568362 | 5/1980 | United Kingdom . |

*Primary Examiner*—Arun S. Phasge
*Attorney, Agent, or Firm*—Sixbey Friedman Leedom & Ferguson

[57] ABSTRACT

The invention relates to a hydrometallurgical process for decontaminating soils 1 which are polluted with metallic elements, comprising a stage of basic leaching I so as to bring about the dissolution of the metallic elements to be removed, a cementation stage II bringing about the precipitation 6 of said elements in metal form, performed by electrochemical exchange with a zinc powder 5 produced by a stage of electrolysis III of the solution 7 originating from the cementation stage. In accordance with the invention a complementary addition of zinc is performed, preferably at the exit of the leaching stage in the form of a leachate 17 of waste from iron and steel manufacture, especially of dust 13 from electrical steel manufacture 15.

12 Claims, 1 Drawing Sheet

PROCESS FOR DECONTAMINATION SOILS POLLUTED WITH METALS

FIELD OF THE INVENTION

The invention relates to a process for decontaminating soils polluted with metals.

Protection of the environment has become a continuous preoccupation for a number of years and many studies have been conducted to solve the problems related to pollution.

Pollution of soils with metallic elements, caused in various ways, entails not only the presence of said elements in a concentration that is too high in relation to the accepted standards, but which can also entail a pollution of the aquifer strata and of watercourses.

It is therefore important to have the ability of treating these polluted soils so as to decrease this pollution by restoring the concentrations of metallic elements to levels which conform to the accepted standards.

However, the only decontamination methods available at present are of pyrolytic type or of hydrometallurgical type using an acidic route, and therefore they result particularly in the formation of wastes which are impossible to recycle, requiring storage, or in the release of toxic gases.

PRIOR ART

Nevertheless, a process for hydrometallurgical treatment by a basic route employing zinc, of the sludge and dust from iron and steel manufacture is known, for example from Document BE-A-894,733, which consists in the combined use of three successive operating stages, and in this order:

leaching of the sludge with soda (therefore a basic medium);

cementation by adding Zn metal to the leaching solution to precipitate and recover the metals which are more electronegative than zinc and to collect a solution rich in dissolved zinc;

electrolysis of this solution to recover the dissolved zinc by cathodic reduction.

However, this method, designed for the treatment of materials which are sufficiently rich in zinc to begin with (traditionally approximately from 5 to 50% by weight in the case of steel plants dust) is unsuitable for the treatment of substances with a low zinc content or even free from zinc, as is generally the case with the polluted soils with which the invention is primarily concerned.

The same observation applies to the treatment, similar to that outlined above, described in Document GB-A-1,568, 362.

SUMMARY OF THE INVENTION

The aim of the invention is to arrive at a hydrometallurgical treatment with zinc, capable of efficiently decontaminating substances with a low or zero zinc content, such as polluted soils.

To this end, the subject of the invention is a hydrometallurgical process by a basic route using zinc for decontaminating soils polluted with metallic elements, these soils being slightly or not zinc-bearing, comprising a leaching stage so as to bring about the dissolution of the metallic elements to be removed, a cementation stage bringing about the deposition of said elements in metal form, performed by exchange with a zinc powder produced by a stage of electrolysis of the solution originating from the cementation stage, and according to which the zinc concentration of the solution subjected to the electrolysis stage is brought to a sufficient value (namely approximately at least 8 g/l) to satisfy the conditions required to obtain zinc powder in the electrolysis stage, by introducing elemental zinc in a soluble or dissolved form at any stage of the process, complementing the addition of metallic zinc performed in the cementation stage originating from the electrolysis stage.

In accordance with a preferred embodiment of the invention the complementary introduction of elemental zinc is performed at any stage between the output from the leaching stage and the input of the electrolysis stage in the form of a basic leachate of waste from iron and steel manufacture, especially of dust from electrical steel manufacture. Also preferably, said leachate is added to the main leachate originating from the treatment of the soils at the exit from the leaching stage, before the cementation stage.

One of the secondary characteristics of the invention is that the electrolysis of the solution is advantageously carried out on a magnesium cathode, preferably with a high current density, which enables the zinc to be recovered in the form of ultrafine zinc powder exhibiting properties which are particularly suitable for its recycling towards the cementation stage of the process according to the invention. However, as a result of its qualities, this ultrafine powder can also be employed in other fields of application and can be optionally marketed in its totality or partially.

According to one possibility of the invention, a first addition of zinc powder is carried out during the first cementation; the zinc powder produced subsequently during the electrolysis stage is reintroduced into the process circuit to carry out the following cementations. This advantageously results in a system for the production and internal consumption of zinc powders.

In its practical application the process according to the invention makes possible a decontamination of soils polluted with metals such as, especially, lead, copper, tin, nickel, arsenic, zinc or cadmium.

In the most frequent cases of polluted soils to be treated, the invention applies to the treatment of soils which are initially not zinc-bearing; however, it can be applied equally effectively and advantageously to other applications where the composition to be treated itself contains zinc in any form, for example to slag heaps and other dumps from iron and steel manufacture.

Thus, the process of the invention can be advantageously applied as a remedy to any pollutions, besides those of natural soils, caused by the presence of metallic elements, especially in the treatment of spent electrical batteries or of steel plants dust and for the treatment of certain ores.

"Polluted soils" within the meaning of this specification will therefore mean not only natural soils, but any other substance capable of undergoing a decontamination treatment in order to remove the above-mentioned undesirable metals therefrom.

BRIEF DESCRIPTION OF THE DRAWINGS

The invention will be understood properly and other aspects and advantages will emerge from the description which follows, given with reference to the appended plate of drawings, on which.

In the figures the same components are indicated using identical references.

Figure 1:
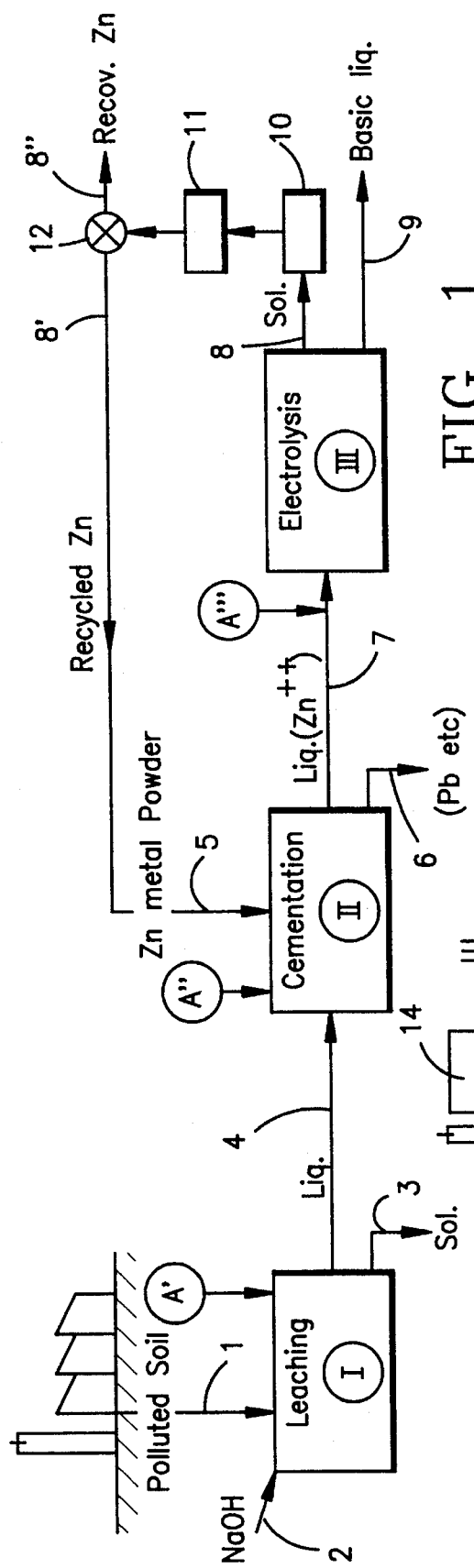
FIG. 1 gives a basic flow sheet of the process according to the invention in its general form.

Reference is made firstly to FIG. 1, which is read from left to right:

Leaching stage I

The leaching stage I allows the metallic elements present in the polluted soil to be treated 1 to be dissolved.

The leaching is preferably carried out in a basic medium created by an input 2 of NaOH in order to precipitate in the form of insoluble hydroxides metals which may be present, such as iron, which will then be capable of being extracted simply by solid-liquid separation, the other elements going into solution both in basic medium and in acidic medium.

The contaminated soil 1 is first of all passed through a screen, not shown, so as to remove all the gravel and other vegetable debris which generally contain little or no contaminating metals. These debris and gravel are washed to remove the residual soil which may contain the contaminating metals. It is advantageous for the leaching that the soil should be screened as finely as possible. Wherever possible, crumbling would be advantageous in order to improve the kinetics of leaching, which are related to the particle size of the soil.

The soil is next suspended in a soda solution. The metals which are then present go into solution; the iron which may be present precipitates, as already said, as hydroxide, which will be removed by a subsequent solid-liquid separation.

The kinetics of leaching of metals in the form of salts, especially carbonates and sulfates, or of oxides, are much faster than those of leaching of metals in metallic form.

Thus, for example, lead reacts according to the following reactions:

$$Pb^{2+}+4\ OH^-\rightarrow PbO_2^{2-}+2\ H_2O$$

$$PbO+2\ OH^-\rightarrow PbO_2^{2-}+H_2O$$

In a particularly advantageous manner, aqueous hydrogen peroxide ($H_2O_2$) may be injected into the solution so as to oxidize the metals present in metallic form. For example, in the case of lead the following reactions take place:

$$Pb+H_2O_2+2\ O^-\rightarrow PbO_2^{2-}+2\ H_2O$$

or $$Pb+1/2\ O_2+2\ OH^-\rightarrow PbO_2^{2-}+H_2O$$

The use of ultrasonics during the leaching stage can advantageously improve the leaching. In fact, ultrasonics permit an increase in the solid/liquid contact by creating powerful agitation.

In a particularly advantageous manner the use of ultrasonics can also entail the formation of aqueous hydrogen peroxide, which is useful for the oxidation of the polluting elements in metallic form.

Aluminosilicates (clays) may also be present in the soils and they too may then partially dissolve during the leaching. They can be reprecipitated by injecting lime into the solution.

The presence of salts may also be ascertained and they, too, go into solution. They will be advantageously removed at the end of treatment by evaporation or by ion exchange resins, if their concentration is too high.

A solid/liquid separation is performed next. The soil 3 thus decontaminated is then washed in basic medium, neutralized, filtered and may be replaced after a check. The process according to the invention therefore allows all the soil treated to be decontaminated.

Cementation stage II

The leachate (or permeate) 4 containing the dissolved metals is then subjected to a cementation stage II which allows the dissolved metals to be extracted with the aid of zinc powder by electrochemical exchange.

Thus, for example, in the case of a solution containing lead, the following redox reaction takes place:

$$Zn+PbO_2^{2-}\rightarrow ZnO_2^{2-}+Pb$$

The addition of metallic zinc in powder form 5 is advantageously carried out so as to bring about a complete reaction between the zinc and the polluting metals. A new liquid/solid separation is performed next. The metal cements 6 thus obtained are then washed and filtered off.

According to another special feature of the invention, the metals present in the cements 6 can be recycled so that they do not form unusable waste which must be stored as a controlled dump.

The solution 7 originating from the cementation stage, containing zinc in the form of zincates, is then subjected to an electrolysis III.

Electrolysis stage III

The electrolysis III according to the invention is carried out in conditions which make it possible to obtain ultrafine zinc powders 8 which can be employed entirely or partially 8' for cementation by recycling. The zinc powder, optionally obtained in excess 8", is in a form which allows it to be marketed for other fields of application, such as especially anticorrosion paints. The basic solution 9 can be recycled to leaching I so as to create a closed-loop liquid circuit between the three treatment stages.

The use of a magnesium cathode advantageously makes it possible to obtain a zinc deposit which is not very adherent and in a higher faraday efficiency than with the other cathodes employed during alkaline electrolyses.

In a particular embodiment of the invention, applied to the treatment of polluted soils, the soda concentration of the solution containing the zinc is from 240 to 300 g/l, that is approximately 6N. This concentration makes it possible to attain a maximum conductivity of the solution and a maximum solubilization of 45 to 50 g/l of zinc.

In this soda solution the zinc is present in the form of zincates $ZnO_2^{2-}$ and dissolves, for example in the leaching stage I, according to the following reaction:

$$ZnO+2\ OH^-\rightarrow ZnO_2^{2-}+H_2O$$

In order to obtain the following characteristics in the electrolysis stage III:

Faraday efficiency: >90%

Specific output rate: 1.9 kg/h m$^2$

Energy usage: <4 kWh/kg the work is done at a solution temperature of 20° to 50° C. and preferably at 40° C. If 50° C. is exceeded, an excessively adherent massive deposition and an excessively rapid redissolving of the zinc powder can be observed.

The density of the electrolysis current is high. The most appropriate value is a function of the temperature. It generally lies between 10 and 30 A/dm$^2$, and will be preferably of the order of 20 A/dm$^2$.

The solubility limit of zinc oxide in 6N soda is from 45 to 50 g/l. The concentration of the zinc solutions which can be treated by the process of the invention lies between 0 and 50 g/l and preferably between 8 and 45 g/l. In all cases, if work is done with a concentration of less than 8 g/l, there is a corresponding risk that the zinc deposit will separate off and will then produce short circuits. In addition, the faraday efficiency tends to become lower than 50%.

Since the zinc deposit on the cathode is not very adherent, a pneumatic vibrator may be employed on the cathode, permitting a complete separation of the deposit, which leaves the cathode clean and smooth.

Thus, the vibrator acts sequentially so as to allow a sufficiently large deposit to be formed, which separates off proportionately more easily under the effect of its own weight.

The formation of a large deposit also entails the advantage of bringing about a drop in the electrical resistance of the circuit and in the energy usage, and additionally allows the faraday efficiency to be increased.

The pneumatic vibrator fitted on the magnesium cathodes is advantageously employed in cycles of 2 times 5 seconds every 45 min in the case of zinc concentrations ranging up to 13 g/l and every 15 min in the case of zinc concentrations of 13 to 8 g/l.

This vibrator preferably has a power equivalent to the vibrator of CFP45 type marketed by the French Société Anonyme "Vibration Industrielle" for approximately 5 cathodes of 1 m²; other equipment may also be suitable.

At the exit from the electrolysis III a washing 10 makes it possible to remove the impurities present in the zinc powder and to destroy the zinc agglomerates which may exist.

Since the zinc powder is in a basic medium, it is essential to avoid any contact with air so as to avoid zinc oxidation.

The washing 10 of the zinc powder is performed with a 6N soda solution free from dissolved zinc so as to entrain the complexes of zincate type which are present in the solution impregnating the dust, and this makes it possible subsequently to avoid the formation of zinc hydroxide during the neutralization.

A passivation 11 is then performed with the aid of sodium dichromate or other passivating agent in order to form a layer of zinc chromate at the surface of the zinc dust and so to avoid any oxidation and carbonation.

Thus, in the case of sodium dichromate, the reactions governing the passivation are:

$$2 CrO_4^{2-} + 3 Zn + 8 H_2O \rightarrow 2 Cr(OH)_3 + 3 Zn^{2+} + 10 OH^-$$

$$3 CrO_4^{2-} + 3 Zn^{2+} \rightarrow 3 ZnCrO_4$$

The washing stage 10 allows for the factors involved in the purity and the disintegration of the powders.

Thus, a sufficient agitation of the powder permits a removal of the zincates and a complete passivation. A decrease in the particle size entails an increase in the specific surface. The mass of the chromate or of another type of passivator must not impair the purity of the powder by an excess which is too large in relation to the quantity needed for total passivation. An ultrasonic system is also employed particularly advantageously, making possible the disintegration of the powder and also the fractionation of the fern-like crystals formed.

A decrease in the particle size, an improvement in the contact with the dust and a removal of the zinc hydroxide during the washing with soda are thus obtained.

The zinc powders obtained exhibit the following characteristics:

purity>95% mean particle size from 1 to 10 μm form: fern-like crystals, plates specific surface from 0.9 to 4 m²/g.

These characteristics allow the zinc powders to be advantageously employed during the cementation stage II of the process of the invention. For this purpose a separator 12 makes it possible to determine the quantity 8' to be recycled and the quantity of powder 8" to be recovered, which is washed with demineralized water before drying in the oven between 80° and 180° C.

Complementary input of zinc 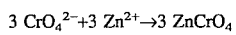

According to an essential characteristic of the process according to the invention, an input of elemental zinc is performed as a complement to the introduction of zinc metal powder in the cementation stage II. This complementary zinc input can be performed at any time in the process [at 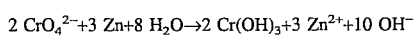 (leaching), Ⓐ' (cementation), or Ⓐ" (electrolysis)], but in a dissolved ($Zn^{++}$) or soluble (oxide) form. The primary function of this input of the elemental zinc is to arrive at a minimum concentration, of the order of 8 g/l, desired in electrolysis to satisfy the conditions required in this stage for a stable deposition of zinc powder on the cathode. This makes it possible to make up for the deficiency of zinc in the soils to be treated and which cannot be met solely by the input of metallic zinc performed in the cementation stage II. The primary function of the latter input is, in fact, to reduce the metals to be recovered as cement 6, and it is only in competition with this redox reaction that the zinc metal is subsequently encountered in dissolved form in the electrolyte.

Figure 2:
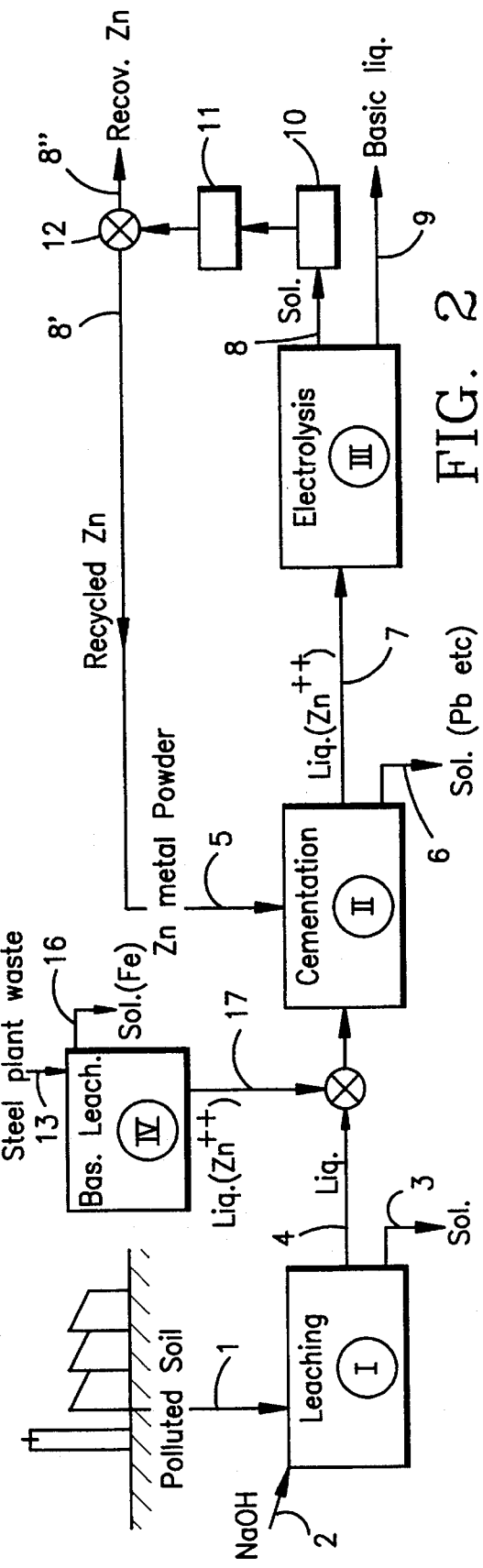
FIG. 2 is a flow sheet illustration similar to FIG. 1, of a preferred embodiment of the process according to the invention.

In accordance with a preferred embodiment of the invention, illustrated in FIG. 2, this complementary introduction of zinc is performed in dissolved form in the leachate 4 originating from the leaching stage I and starting with waste from iron and steel manufacture which is naturally rich in zinc in oxide form, such as the dust from electrical steel manufacture.

Thus, the dust from iron and steel manufacture 13, originating from the removal of dust 14 from the fumes from an electrical furnace 15, is subjected to a basic leaching treatment IV, so as, on the one hand, to dissolve the Zn by digesting these oxides with soda and, on the other hand, to precipitate the iron in the form of insoluble hydroxides 16 in order to enable it to be extracted with a view to a possible recovery.

The basic leachate 17 containing the dissolved zinc is added to the main leachate 4 from the treatment of the soils upstream of the cementation stage II by means of a mixing valve 18 which makes it possible to regulate the proportion of the leachate 17 in the leachate 4.

There may, in fact, be a disadvantage in introducing this leachate 17 already into the leaching stage, because of the property, which some soils may exhibit, of binding zinc which would be subsequently found again in the solid soil fraction 3 returned to the dump, whereas the treated polluted soil did not contain any, at least to begin with.

This said, the addition of this leachate 17 may be performed at any time between the discharge from the leaching stage I and the electrolysis stage III.

If need be, the basic solution 9 originating from the electrolysis can itself be electrolyzed again merely to lower its dissolved zinc content before being recycled into the leaching stage I, if the zinc-adsorption properties of the polluted soil were to result in exceeding the standards permitted by regulations covering releases to the natural environment. The intensity of the electrolysis current may be appreciably lowered in relation to that used in electrolysis I.

It will be noted that sources of complementary zinc other than the leached waste from iron and steel manufacture may be suitable. For example, spent electrical batteries nowadays represent a zinc-rich deposit which is quite suitable for this purpose.

The decontamination process according to the invention exhibits a number of advantages such as its simplicity in use, the absence of secondary pollutions and its selectivity for the metallic elements to be removed. Thus, for example non-toxic iron is not dissolved.

Furthermore, the decontamination process according to the invention may in some cases allow the treated earth to be replaced back completely without having to be dumped, as in the case of other methods.

The decontamination process according to the invention allows the extracted metals to be recycled. The metals 6 thus recovered and the zinc powder 8″ produced by the electrolysis can be advantageously resold so as to be reemployed in various fields of application.

The decontamination process according to the invention thus has the advantage of being nonpolluting, the only discharge performed being that of salty water.

The process according to the invention enables zinc to be recovered in the form of metallic zinc powder which can be employed commercially in various fields of application, such as especially anticorrosion paints.

It is easy to understand that any traditional hydrometallurgical processes for purifying the solution originating from the cementation stage necessary for treating other pollutants not mentioned as an example may be employed within the scope of the invention so as to make it possible to produce a zinc powder usable for the cementation stage of the process of the invention, or else marketable.

DESCRIPTION OF THE PREFERRED EMBODIMENT

A particular embodiment will now be described more completely, no limitation being implied, illustrated by the example hereinafter of decontamination of a sample of soil polluted with lead.

A sample of 100 g of soil incorporating a lead content of 1.2% is screened on a 0.8 mm mesh.

This sample is then subjected to a leaching for a period of 1 h 30 min and at a mean temperature of 95° C. One liter of a soda solution containing from 250 to 300 g/l of NaOH is employed.

An injection of $H_2O_2$ at a concentration of 2% per 100 ml is performed for 30 min after one hour's leaching. If the injection is carried out as soon as the leaching begins, the duration of the latter would be undoubtedly shortened thereby.

Energetic stirring is maintained.

Lime (CaO) is added in a stoichiometric ratio higher than 1 so as to obtain a reprecipitation of the aluminosilicates which may have gone into solution.

The solid/liquid separation is performed in a centrifuge at 2000 rev/min for one minute.

The soil is then redissolved in one liter of 6N soda.

The solution is stirred with a mechanical stirrer and then again centrifuged at 2000 rev/min for one minute.

However, the use of 6N soda solution is not essential, insofar as it suffices to remain in a basic medium (pH=14) to avoid any reprecipitation of lead in the form of hydroxide.

The soil recovered after the second centrifuging is neutralized with the aid of hydrochloric acid in one liter of water. The soil is left to settle for 1 hour and the solution is then filtered. The soil residue is dried for 24 h in an oven at 95° C.

The solution obtained after leaching still contains approximately 1.2 g/l of lead and 1 to 3 g/l of silica.

An approximate quantity of 1 liter of basic leachate 17 of dust from iron and steel manufacture is then added to 40 g of zinc per liter so as to reach a dissolved zinc content of 20 g/l at the time of the electrolysis, allowing for the addition of dissolved zinc made during the cementation.

Powdered zinc metal is next added accurately in a stoichiometric ratio to lead of 1.5 to 2. The zinc powder is advantageously that produced during the electrolysis.

After one hour of cementation performed with gentle stirring the lead content is brought down to less than 70 mg/l.

The electrolysis of the solution containing the zinc is then carried out on a magnesium cathode with a current density of 20 $A/dm^2$ at a temperature of 20° C.

A soil lead content which is lower than 300 ppm is thus obtained. The recovered soil mass is 80 to 90 g and therefore represents a loss of only 10 to 20 g.

Naturally, and as is already evident from the above, the invention is not limited to the particular embodiment which has been described by way of example, but includes all the alternative forms and equivalents which can be read into the definition of the invention given in the attached claims.

We claim:

1. A process for decontaminating soils polluted with metallic elements, comprising the steps of:

the polluted soils in a basic medium to bring about a selective dissolution of metallic elements to be removed, cementing the leachate originating from the leaching step to bring about the deposition of said elements in metal form, performed by exchange with metallic zinc, electrolyzing the solution originating from the cementation step to produce metallic zinc in powder form, and recycling said powdered metallic zinc in its entirety or partially into the leachate during the cementation step to satisfy the requirements for metallic zinc in said cementation step, and adjusting the concentration of zinc in the solution originating from the cementation step to a value of 8 g/l to satisfy the conditions required to obtain a stable deposition of zinc powder on a cathode in the electrolysis step by introducing elemental zinc in a soluble or dissolved form at any step of the treatment, complementing the addition of metallic zinc performed in the cementation step originating from the electrolysis step.

2. The process for decontaminating polluted soils as claimed in claim 1, wherein the complementary introduction of elemental zinc is performed at the outlet of the leaching step in the form of a basic leachate of waste from iron and steel manufacture.

3. The process as claimed in claim 2, wherein said waste from iron and steel manufacture is dust from electrical steel manufacture.

4. The process for decontaminating polluted soils, as claimed in claim 1, wherein the electrolysis is carried out with a magnesium electrode forming the cathode.

5. The process for decontaminating polluted soils as claimed in claim 4, wherein the electrolysis step is performed with a high current density of between about 10 and 30 $A/dm^2$.

6. The decontamination process as claimed in claim 4, wherein the cathode in the electrolysis is subjected to vibrations.

7. The decontamination process as claimed in claim 4, wherein the electrolysis step is carried out at a temperature of between about 20° to 50° C.

8. The decontamination process as claimed in claim 1, wherein the step of leaching in a basic medium is carried out with a soda solution with a strength of 240 g/l to 300 g/l.

9. The decontamination process as claimed in claim 1, wherein an injection of aqueous hydrogen peroxide is performed during the leaching step.

10. The decontamination process as claimed in claim 1, wherein the leaching step is performed at a temperature higher than or equal to 90° C.

11. The decontamination process as claimed in claim 1, wherein the leaching step is performed in the presence of ultrasound.

12. The decontamination process as claimed in claim 1, wherein during the step of cementation with zinc powder, the latter is added in a stoichiometric ratio of 1 to 2 to the metallic element.

* * * * *